United States Patent
Geprägs et al.

(10) Patent No.: US 6,284,868 B1
(45) Date of Patent: Sep. 4, 2001

(54) FUNCTIONALIZED CARBON MONOXIDE COPOLYMERS

(75) Inventors: Michael Geprägs, Lambsheim; Joachim Queisser, Mannheim; Bernhard Rieger; Roland Wursche, both of Ulm, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/445,764

(22) PCT Filed: Jun. 10, 1998

(86) PCT No.: PCT/EP98/03518

§ 371 Date: Dec. 13, 1999

§ 102(e) Date: Dec. 13, 1999

(87) PCT Pub. No.: WO99/00443

PCT Pub. Date: Jan. 7, 1999

(30) Foreign Application Priority Data

Jun. 26, 1997 (DE) ................................................ 197 27 271

(51) Int. Cl.$^7$ ..................................................... C08G 67/02

(52) U.S. Cl. ........................... 528/392; 528/86; 528/205; 502/202; 502/208; 502/230

(58) Field of Search ............................. 528/392, 86, 205; 502/202, 208, 230

(56) References Cited

FOREIGN PATENT DOCUMENTS 463 689   1/1992   (EP) .
501 586   9/1992   (EP) .

OTHER PUBLICATIONS

Macromolecules 1996, 29, 5852–5858, Kacker et al.
Macromolecules, vol. 29, No. 13, 1996, 4806–4807. Abi–Surrah et al.
Chem. Abstr. vol., 128, No. 3, Abst. No. 23236, (1998).
Chem. Rev. 1996, 96, 663–681, Drent et al.

Primary Examiner—Samuel A. Acquah
(74) Attorney, Agent, or Firm—Keil & Weinkauf

(57) ABSTRACT

In functionalized linear alternating carbon monoxide copolymers of carbon monoxide and at least one 1-alkene (A), compound (A) is an aryl derivative substituted with at least one terminal allyl and/or homoallyl moiety and containing one or more polar groups, with the proviso that 4-allylanisole is excluded.

6 Claims, No Drawings

FUNCTIONALIZED CARBON MONOXIDE COPOLYMERS

The present invention relates to functionalized linear alternating carbon monoxide copolymers of carbon monoxide and at least one 1-alkene (A), wherein compound (A) is an aryl derivative substituted with at least one terminal allyl and/or homoallyl moiety and containing one or more polar groups, with the proviso that 4-allylanisole is excluded.

The invention further relates to functionalized linear alternating carbon monoxide copolymers of carbon monoxide, at least one 1-alkene (A) and at least one $C_2$–$C_{10}$-1-alkene (B).

In addition, the invention relates to processes for preparing functionalized linear alternating carbon monoxide copolymers of carbon monoxide, 1-alkenes (A) and, if desired, 1-alkenes (B) and to the use of the carbon monoxide copolymers for the preparation of sheets, films, moldings and coatings.

Given that a multiplicity of ways are known for making binary and ternary carbon monoxide copolymers (cf. E. Drent, P. H. M. Budzelaar, Chem. Rev. 1996, 96, 663–681), recent work has been directed to the extension or controlled modification of the property profile of conventional carbon monoxide copolymers by process or product modifications. One possibility is, for example, the incorporation of long-chain α-olefin units in the carbon monoxide copolymer framework giving copolymers having comparatively low glass transition temperatures ($T_g$), as shown by Rieger et al. (Macromolecules 1996, 29, 4806).

Sen et al. (Macromolecules 1996, 29, 5852–5858) describe the preparation of chiral, functionalized polyketones of carbon monoxide and various linear α-olefins having a hydroxyl or carboxyl group in ω-position. Satisfactory yields and molecular weights $M_w$, however, have only been obtainable using the chiral dicationic complex [Pd((R,R)—(CH$_3$)-DUPHOS)(CH$_3$CN)$_2$](BF$_4$)$_2$([(R,R)—(CH$_3$)-DUPHOS]=(–)-1,2-bis((2R,5R)-2,5-dimethylphospholano)benzene). This complex cannot, however, be prepared in a chemically trivial manner and does not make it possible to obtain functionalized carbon monoxide copolymers in an economical way. Furthermore, the abovementioned chiral complexes give polymer products which have a high degree of order and are thus obtained crystalline in most cases. The associated poor solubility characteristics are disadvantageous with regard to reaction control, work-up and further processing or an industrial scale in particular. The success of the catalyst system described by Sen et al. is attributed to the bulky bidentate chelating ligand which prevents the undesirable blocking of the metal coordination sphere by functional groups. The copolymerization of carbon monoxide with 4-allylanisole yielded, for example, a product mixture comprising an alternating 1,4-copolymer and a copolymer having spiroketal units incorporated in a regular manner.

As disclosed in EP-A 0 463 689, the functional group present in a monomer should not be too close to a terminal double bond, because otherwise little or no copolymerization will be observed. Using known catalyst systems, for example based on palladium(II) acetate, 1,3-bis (diphenylphosphino)propane and copper p-tosylate, however, the preparation of functionalized carbon monoxide copolymers is said to be successful when the functional group is not directly attached to the terminal double bond system and at least one alkylene bridge is interposed. Functionalized carbon monoxide copolymers having molecular weights $M_w$>1000, in particular >5000 g/mol, however, are only obtained on using a special bidentate bridging phosphine ligand having only aliphatic substituents on the phosphorus atoms, e.g. 1,3-bis(di-n-butyl-phosphino) propane.

It would therefore be desirable to be able to obtain carbon monoxide copolymers of carbon monoxide and α-olefins having one or more functional units adjacent to the terminal double bond by processes which are unproblematical on an industrial scale and by using easily obtainable catalyst systems.

It is an object of the present invention to provide functionalized carbon monoxide copolymers having high molecular weights using easily obtainable catalyst systems and straightforward processes in good yields.

We have found that this object is achieved by functionalized linear alternating carbon monoxide copolymers of carbon monoxide and at least one 1-alkene (A), wherein compound (A) is an aryl derivative substituted with at least one terminal allyl and/or homoallyl moiety and containing one or more polar groups, with the proviso that 4-allylanisole is excluded.

Furthermore, we have found functionalized linear alternating carbon monoxide copolymers of carbon monoxide, at least one 1-alkene (A) and at least one $C_2$–$C_{10}$-1-alkene (B).

Furthermore, we have found processes for the preparation of functionalized linear alternating carbon monoxide copolymers and their use for the preparation of sheets, films, moldings and coatings.

Copolymers of the present invention are made up of units which are derived from the monomers carbon monoxide and one or more olefinically unsaturated compounds.

In the binary copolymers of the present invention, the different monomer units are generally present in strictly alternating order. In the ternary and higher copolymer systems, the order of carbon monoxide and olefin components is generally likewise strictly alternating, with the functionalized α-olefins being incorporated into the linear copolymer chain essentially randomly with regard to the possible olefin unit positions.

Suitable α-olefinically unsaturated compounds (A) for the binary and higher copolymers of the invention are in principle aryl derivatives substituted with at least one terminal allyl and/or homoallyl moiety and containing one or more polar groups, except that 4-allylanisole is excluded for binary systems.

Functionalized α-olefins or 1-alkenes (A) used are preferably compounds of the formula (Ia) or (Ib)

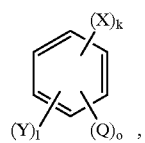

(Ia)

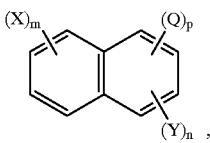

(Ib)

where
X is OR$^1$, NR$^2$R$^3$, halo, such as fluoro, chloro, bromo, iodo, nitro or CO$_2$R$^4$ where
R$^1$ is hydrogen, linear and branched C$_1$–C$_{10}$-alkyl, preferably C$_1$–C$_6$-alkyl, such as methyl, ethyl, n-propyl, i-propyl, n-butyl or t-butyl, especially methyl, $C_3$–$C_{10}$-cycloalkyl, preferably $C_3$–$C_6$-cycloalkyl, such as cyclopropyl or cyclohexyl, $C_6$–$C_{14}$-aryl, preferably $C_6$–$C_{10}$-aryl, especially phenyl, $C(O)R^5$ or $Si(R^6)_3$ where $R^5$ is linear and branched $C_1$–$C_{10}$-alkyl, preferably $C_1$–$C_6$-alkyl, such as methyl, ethyl, n-propyl, i-propyl, n-butyl or t-butyl, especially methyl, or $C_6$–$C_{14}$-aryl, preferably $C_6$–$C_{10}$-aryl, especially phenyl, $R^6$ is independently of each appearance linear or branched $C_1$–$C_{10}$-alkyl, preferably $C_1$–$C_6$-alkyl, such as methyl, ethyl, n-propyl, i-propyl, n-butyl or t-butyl, especially methyl, $C_3$–$C_{10}$-cycloalkyl, preferably $C_3$–$C_6$-cycloalkyl, such as cyclopropyl or cyclohexyl, or $C_6$–$C_{14}$-aryl, preferably $C_6$–$C_{10}$-aryl, especially phenyl, $R^2$, $R^3$ are each hydrogen, linear or branched $C_1$–$C_{10}$-alkyl, preferably $C_1$–$C_6$-alkyl, such as methyl, ethyl, n-propyl, i-propyl, n-butyl or t-butyl, especially methyl, $C_3$–$C_{10}$-cycloalkyl, preferably $C_3$–$C_6$-cycloalkyl, such as cyclopropyl or cyclohexyl, or $C_6$–$C_{14}$-aryl, preferably $C_6$–$C_{10}$-aryl, especially phenyl, or are, together with N, a saturated or unsaturated cycle consisting of 2–10 carbon atoms, preferably 4–6 carbon atoms, such as pyrrole, pyrrolidine or pyrrolidinone, or a cycle consisting of 2–10 carbon atoms, preferably 4–6 carbon atoms, and at least one further hetero atom such as nitrogen or oxygen in the cycle, for example morpholine, $R^4$ is linear or branched $C_1$–$C_{10}$-alkyl, preferably $C_1$–$C_6$-alkyl, such as methyl, ethyl, n-propyl, i-propyl, n-butyl or t-butyl, especially methyl, or $C_6$–$C_{14}$-aryl, preferably $C_6$–$C_{10}$-aryl, especially phenyl, Y is a compound of the formula (II)

$$CH_2=C(R^7)(C(R^8)_2)_q-\qquad\qquad (II),$$

where $R^7$ is hydrogen, linear or branched $C_1$–$C_{10}$-alkyl, preferably $C_1$–$C_6$-alkyl, such as methyl, ethyl, n-propyl, i-propyl, n-butyl or t-butyl, especially methyl, $C_3$–$C_{10}$-cycloalkyl, preferably $C_3$–$C_6$-cycloalkyl, such as cyclopropyl or cyclohexyl, $C_6$–$C_{14}$-aryl, preferably $C_6$–$C_{10}$-aryl, especially phenyl, and $R^8$ is independently at each appearance hydrogen, linear and branched $C_1$–$C_{10}$-alkyl, preferably $C_1$–$C_6$-alkyl, such as methyl, ethyl, n-propyl, i-propyl, n-butyl or t-butyl, especially methyl, $C_3$–$C_{10}$-cycloalkyl, preferably $C_3$–$C_6$-cycloalkyl, such as cyclopropyl or cyclohexyl, $C_6$–$C_{14}$-aryl, preferably $C_6$–$C_{10}$-aryl, especially phenyl, or halo, such as fluoro, chloro, bromo, iodo, and q is 1 or 2, Q is linear or branched $c_1$–$C_{10}$-alkyl, preferably $C_1$–$C_6$-alkyl, such as methyl, ethyl, n-propyl, i-propyl, n-butyl, s-butyl or t-butyl, especially methyl or t-butyl, $C_3$–$C_6$-cycloalkyl, preferably $C_3$–$C_6$-cycloalkyl, such as cyclopropyl or cyclohexyl, $C_6$–$C_{14}$-aryl, preferably $C_6$–$C_{10}$-aryl, especially phenyl, aralkyl having from 1 to 6, preferably from 1 to 3, carbon atoms in the alkyl moiety and from 6 to 14, preferably from 6 to 10, carbon atoms in the aryl moiety, for example benzyl, or $C_3$–$C_{30}$-organosilyl, for example trimethyl-, triethyl-, triisopropyl-, triphenyl-, t-butyldiphenyl- or thexyldimethylsilyl, preferably trimethylsilyl, where in the case of formula (Ia)

k, l are each an integer from 1 to 5 and o is an integer from 0 to 4 where $k+l+o \leq 6$ and in the case of formula (Ib)

m, n are each an integer from 1 to 7 and p is an integer from 0 to 6 where $m+n+p \leq 8$.

Particularly suitable compounds (A) have a terminal allyl moiety, i.e. compounds of the formulae (Ia) and (Ib) where q=1. Of these olefinic monomers, the preferred monomers have the terminal allyl moiety in a position ortho to a polar group. Examples which may be mentioned are naphthyl compounds having an allyl moiety in 1-position and a polar group in 2-position or having an allyl moiety in 2-position and a polar group in 1- and/or 3-position and especially allylphenyl compounds having one or two polar groups in a position ortho to the allyl moiety.

Polar groups that can be used are in principle functional groups on the basis of elements of groups IVA, VA, VIA or VIIA of the Periodic Table of the Elements, e.g. hydroxyl, alkoxy, amino, nitro or ester groups and halogens, preference being given to compounds which have one or more hydroxyl or alkoxy groups, especially hydroxyl groups, as polar groups. Suitable compounds are, for example, 2-allylphenol, 2-allylmethoxybenzene, 2-allylethoxybenzene and 2-allyl-t-butoxybenzene, especially 2-allylphenol.

Furthermore, it is generally also possible to use compounds (A) having up to 5 polar groups on the phenyl ring (compounds according to formula (Ia)) and up to 7 polar groups on the naphthyl ring (compounds according to formula (Ib)) as aryl derivative, provided that a terminal allyl or homoallyl moiety is present in the aryl derivative. It is likewise possible for a plurality of allyl or homoallyl moieties, preferably allyl moieties, to be all attached to the aryl derivative (up to 5 for compounds according to formula (Ia) and up to 7 for compounds (Ib)), provided that the aromatic skeleton has, in addition, a polar group.

Terminal allyl or homoallyl moieties also include radicals whose hydrogen radicals, except the terminal hydrogen radicals, are independently of one another substituted for, for example, alkyl groups such as methyl, ethyl or isopropyl, aryl groups such as phenyl or halogens such as fluorine or chlorine. Specific examples that may be mentioned are isopropylidene or isobutylidene moieties. However, preference is given to unsubstituted allyl and homoallyl moieties, especially allyl moieties.

Apart from an allyl or homoallyl group Y and a polar group X, the compounds (A) may have further radicals on the aromatic system. Possible substituents are the radicals Q described at the outset. The radicals Q in (A) can be identical or different. In the aromatic systems of the formulae (Ia) and (Ib), valences which are not saturated by functional groups X, Y and Q are always saturated by hydrogen, ie. via C—H bonds. Thus, suitable compounds (A) also include 1-hydroxy-2,6-dimethyl-4-alkylbenzene, 1-hydroxy-2-allyl-4-tert-butylbenzene, 1-hydroxy-2,6-di-tert-butyl-4-allylbenzene, 1-hydroxy-2-allyl-4-tert-butyl-6-methylbenzene or 1-hydroxy-2-allyl-4-methylbenzene.

Suitable monomers (B) for non-binary carbon monoxide copolymers, especially ternary copolymers, are in principle all compounds of this class, e.g. α-olefins or diolefins having at least one terminal double bond. Examples of suitable α-olefins are $C_2$–$C_{10}$-1-alkenes, such as propene, ethene, 1-butene, isobutene, 4-methyl-1-pentene, 1-hexene, 1-octene and mixtures thereof. It is of course also possible to use 1-alkenes bearing an aromatic radical. For example, styrene or α-methylstyrene may be used, preference is given to styrene. Other 1-alkenes that may be used are heteroatom-containing compounds, such as (meth)acrylic esters or vinyl esters, such as vinyl acetate. Particular preference is given to ethene, propene, 1-butene and styrene, especially propene. These 1-alkenes may of course also be used as a mixture.

Preference is given to carbon monoxide/propene and carbon monoxide/ethene terpolymers with aryl derivatives wherein a terminal allyl moiety and a hydroxyl group are in a position ortho to each other, e.g. 2-allylphenol.

The binary carbon monoxide copolymers of the invention are usually poly-1,4-ketones having a regular structure. If aryl derivatives (A) which have an allyl moiety and a hydroxyl moiety in a position ortho to each other are used, the resulting carbon monoxide copolymer can also contain semiketal moieties which can be present in blocks or randomly distributed along the linear polymer chain. In these cases, the ratio of ketone fragments to ketal fragments is typically in the range from 5:1 to 1:5, preferably in the range from 3:1 to 1:1. The structure of the carbon monoxide copolymers of the invention can be determined by $^{13}C$ NMR spectroscopy (Bruker AMX 500). These binary copolymer systems, but also terpolymers, have increased $T_g$ values compared to conventional carbon monoxide copolymers. The resulting higher strength may be due to reversible crosslinking by semiketal formation.

The average molecular weights $M_w$ of the binary carbon monoxide copolymers of the present invention are usually in the range from 1000 to 100000 g/mol, preferably in the range from 3000 to 80000 g/mol, especially in the range from 5000 to 50000 g/mol (measured by gel permeation chromatography (GPC) at 25° C. using Microstyragel (Waters) as column material and chloroform as solvent against polystyrene standard).

The binary carbon monoxide copolymers generally have narrow molecular weight distributions $M_w/M_n$ (weight average/number average) as measured by gel permeation chromatography (GPC) as described hereinbefore. The $M_w/M_n$ values are preferably in the range from 1.1 to 3.5, especially smaller than 2.5. Particular preference is given to carbon monoxide copolymers of the invention having $M_w/M_n$ values in the range from 1.1 to 2.2.

The glass transition temperatures ($T_g$) of the binary carbon monoxide copolymers of the invention, if ascertainable, are usually in the range from 0 to 120° C., preferably in the range from 20 to 100° C., especially from 30 to 70° C.

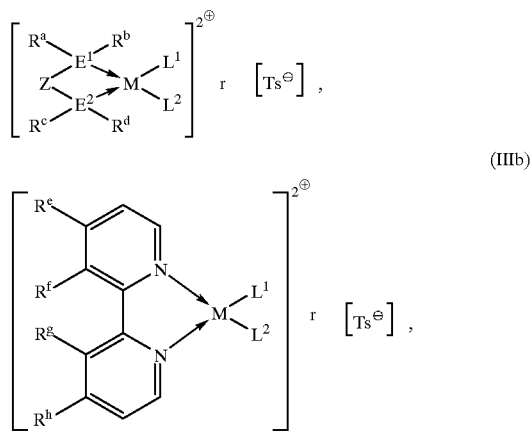

where
M is a metal of group VIIIB of the Periodic Table of the Elements, $E^1$, $E^2$ are each an element of group VA of the Periodic Table of the Elements, Z is a bridging structural unit comprising one, two, three or four structural subunits of elements of group IVA, VA, VIA of the Periodic Table of the Elements, $R^a$ to $R^d$ are substituents selected from the group consisting of $C_1$–$C_{20}$ organocarbon and $C_3$–$C_{30}$ organosilicon radicals which may contain one or more elements of groups IVA, VA, VIA and VIIA of the Periodic Table of the Elements, $R^e$ to $R^h$ are each, independently of one another, hydrogen, linear or branched $C_1$–$C_6$-alkyl or $R^f$ and $R^g$ are together a five- or six-membered carbocycle or heterocycle, $L^1$, $L^2$ are formally uncharged Lewis base ligands, The average molecular weight $M_w$ of the carbon monoxide terpolymers of the invention is usually in the range from 5000 to 500000 g/mol, preferably from 20000 to 300000 g/mol, especially from 50000 to 250000 g/mol.

The $T_g$ values of the terpolymers of the invention are usually in the range from 0 to 120° C., preferably in the range below 90° C.

The proportion in the terpolymers which is derived from compound (A) is generally in the range from 0.1 to 60 mol %, based on the carbon monoxide units in the copolymer (determined on the basis of $^1H$ NMR spectra). Suitable terpolymers typically have from 2 to 50, especially from 3 to 40, mol % of incorporated component (A). Just like the binary systems, the terpolymers and higher copolymers can include randomly distributed or block like, preferably randomly distributed, semiketal structures in addition to pure 1,4-polyketone units. This phenomenon is observed preferentially when the polar group in (A) is a hydroxyl group.

The binary and ternary carbon monoxide copolymers of the invention are generally readily soluble in tetrahydrofuran (THF), toluene, dichloromethane or chloroform.

The molar ratio of carbon monoxide to the sum of the structural units derived from the olefinically unsaturated monomers in the binary or higher carbon monoxide copolymers of the invention is generally 1:1.

Owing to their polar, thermoplastic properties, the polymer materials of the invention have many possible uses, e.g. in the field of polymer blend technology.

To prepare the functionalized linear alternating carbon monoxide copolymers of the invention, carbon monoxide can be copolymerized with 1-alkenes (A) and 1-alkenes (B) in a virtually alcohol-free or water-free polymerization medium in the presence of a catalyst whose active material is formed from a) a metal complex of the formula (IIIa) or (IIIb)

T is a monovalent or divalent anion, r,s are each 1 or 2, provided r×s=2, and b) an activator component which contains a hydroxyl group in the molecule and is used in an amount of from 0 to 1500 molar equivalents, based on M in (III).

As a further process for preparing the linear copolymers of the invention, it is possible to copolymerize carbon monoxide with olefinically unsaturated compounds (A) and, if desired, (B) in a virtually alcohol-free or water-free polymerization medium in the presence of a catalyst whose active material is formed from i) a salt of a metal M of group VIIIB of the Periodic Table of the Elements, ii) one or more compounds selected from the group consisting of protic acids and Lewis acids, iii) a chelating compound of the formula (IVa) or (IVb)

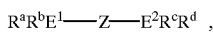
(IVa)

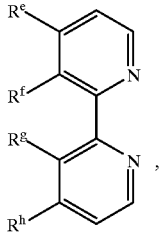
(IVb)

where

E$^1$, E$^2$ are each an element of group VA of the Periodic Table of the Elements, Z is a bridging structural unit comprising one, two, three or four structural subunits of elements of groups IVA, VA, VIA of the Periodic Table of the Elements, R$^a$ to R$^d$ are substituents selected from the group consisting of C$_1$–C$_{20}$-organocarbon and C$_3$–C$_{30}$-organosilicon radicals, where the radicals may contain one or more elements of group IVA, VA, VIA and VIIA of the Periodic Table of the Elements, R$^e$ to R$^h$ are each, independently of one another, hydrogen, linear or branched C$_1$–C$_6$-alkyl or R$^f$ and R$^g$ are together a five- or six-membered carbocycle or heterocycle, iv) an activator component which contains a hydroxyl group in the molecule and is used, based on the metal M in i), in an amount of from 0 to 1500 molar equivalents.

In a preferred embodiment, the binary or higher carbon monoxide copolymers of the invention can be prepared without the addition of an activator component b) or iv), if the 1-alkene (A) is a compound having a hydroxyl functional group as polar group. An example is 2-allylphenol.

The polymerizations for preparing the carbon monoxide copolymers of the invention can be carried out either batchwise or continuously in the presence of a polymerization catalyst comprising a), or i), ii), iii) and optionally b) or iv).

Suitable polymerization catalysts are metal compounds of transition group VIIIB of the Periodic Table of the Elements which are in the form of defined metal complexes (IIIa) or (IIIb) or can be formed in situ from a salt i) of a metal of group VIIIB of the Periodic Table of the Elements, protic and/or Lewis acids ii) and a chelating compound iii) of the formula (IVa) or (IVb). If desired, activators b) or iv) can be added to the metal compounds.

Suitable metals M are the metals of group VIIIB of the Periodic Table of the Elements, i.e. iron, cobalt and nickel, and especially the platinum metals such as ruthenium, rhodium, osmium, iridium, platinum and very particularly palladium. In the metal complexes, the metals cobalt, nickel, palladium and platinum generally formally bear two positive charges, the metals rhodium and iridium generally formally bear one positive charge and the metals iron, ruthenium and osmium are generally formally uncharged. Furthermore, iron and ruthenium can also formally bear two or three positive charges and rhodium can also formally bear three positive charges.

Suitable elements E$^1$ and E$^2$ in the chelating ligand, hereinafter also referred to as chelating compound (IVa), are the elements of main group V of the Periodic Table of the Elements (group VA), i.e. nitrogen, phosphorus, arsenic, antimony or bismuth. Particularly suitable elements are nitrogen or phosphorus, especially phosphorus. The chelating compound (IVa) can contain different elements E$^1$ and E$^2$, for example nitrogen and phosphorus, but it preferably contains identical elements E$^1$ and E$^2$ and in particular E$^1$ and E$^2$ are phosphorus.

The bridging structural unit Z is a group of atoms which connects the two elements E$^1$ and E$^2$ to one another. Structural subunits comprising one atom or a plurality of atoms connected to one another from group IVA, VA or VIA of the Periodic Table of the Elements usually form the bridge between E$^1$ and E$^2$. Possible free valences of these bridge atoms may be saturated in various ways, for example by substitution with hydrogen or elements of group IVA, VA, VIA or VIIA of the Periodic Table of the Elements. These substituents can form ring structures with one another or with the bridge atom.

Very useful bridging structural units Z are those comprising one, two, three or four elements of group IVA of the Periodic Table of the Elements such as methylene(—CH$_2$—), 1,2-ethylene(—CH$_2$—CH$_2$—), 1,3-propylene(—CH$_2$—CH$_2$—CH$_2$—), 1,4-butylene, 1,3-disilapropylene (—R$^5$R$^6$Si—CH$_2$—SiR$^5$R$^6$—, where R$^5$, R$^6$ are each C$_1$–C$_{10}$-alkyl, C$_6$–C$_{10}$-aryl), ethylidene (CH$_3$(H)C=), 2-propylidene ((CH$_3$)$_2$C=), diphenylmethylene ((C$_6$H$_5$)$_2$C=) or ortho-phenylene.

Particularly suitable bridging structural units are ortho-phenylene, 1,3-propylene and 1,4-butylene.

Suitable organic radicals R$^a$ to R$^d$ are, independently of one another, aliphatic, cycloaliphatic and aromatic radicals having from 1 to 20 carbon atoms, for example the methyl, ethyl, 1-propyl, 1-butyl, 1-pentyl, 1-hexyl and 1-octyl groups and also their structural analogs. Linear arylalkyl groups having from 1 to 10 carbon atoms in the alkyl radical and from 6 to 20 carbon atoms in the aryl radical, for example benzyl, are also suitable. Further radicals R$^a$ to R$^d$ which may be mentioned are aryl radicals such as tolyl, anisyl, preferably ortho-anisyl, xylyl and other substituted phenyl groups, especially phenyl.

Possible cycloaliphatic radicals C$_3$–C$_{10}$-monocyclic systems such as cyclopropyl, cyclobutyl, cyclopentyl, cyclohexyl, particularly preferably cyclohexyl.

Suitable branched aliphatic radicals are C$_3$–C$_{20}$-alkyl radicals, preferably C$_3$–C$_{12}$-alkyl radicals such as i-propyl, i-butyl, s-butyl, neopentyl and t-butyl.

Particularly suitable branched aliphatic radicals are t-butyl, i-propyl and s-butyl.

Alkyl groups having branching located further out are also well suited as substituents R$^a$ to R$^d$, for example i-butyl, 3-methyl-2-butyl and 4-methylpentyl.

The substituents R$^a$ to R$^d$ can also, independently of one another, contain atoms from group IVA, VA, VIA or VIIA of the Periodic Table of the Elements, for example halogen, oxygen, sulfur, nitrogen, silicon, for example the bis (trimethylsilyl)methyl group in this case. Functional groups which are inert under the polymerization conditions are also possibilities in this context.

Preferred heterosubstituents R$^a$ to R$^d$ are C$_3$–C$_{30}$-organosilicon radicals, i.e. tetravalent silicon atoms which are attached to E$^1$ or E$^2$ and whose remaining valences bear three organocarbon radicals such as alkyl and/or aryl radicals, the total number of carbon atoms in these three radicals attached to silicon being in the range from three to thirty. Examples are the trimethylsilyl, t-butyldimethylsilyl and triphenylsilyl groups, in particular the trimethylsilyl group.

The chelating ligand or compound (IVa) used is preferably
1,2-bis(diphenylphosphino)ethane,
1,3-bis(diphenylphosphino)propane or
1,4-bis(diphenylphosphino)butane.

The chelating ligand or compound (IVa) used is very particularly preferably 1,3-bis(diphenylphosphino)propane or 1,4-bis-(diphenylphosphino)butane.

In formula (IIIb) or (IVb), radicals $R^e$ to $R^h$ are each, independently of one another, hydrogen, linear or branched $C_1$–$C_6$-alkyl, such as methyl, ethyl or i-propyl. Furthermore, the radicals $R^f$ and $R^g$ together may also form a five- or six-membered carbocycle or heterocycle. For example, chelate ligands (IVb) such as 1,10-phenanthroline, 2,2'-bipyridine or 4,4'-dimethylbipyridine and their substituted derivatives are based on structural units bridged by two atoms.

Suitable formally uncharged ligands $L^1$, $L^2$ are Lewis bases in general, i.e. compounds, preferably organic compounds, having at least one free electron pair or water.

Suitable ligands are Lewis bases whose free electron pair or pairs is/are located on a nitrogen or oxygen atom, i.e. amines, nitriles (R—CN), ketones, ethers or preferably water.

Suitable Lewis bases are $C_1$–$C_{10}$-nitriles such as acetonitrile, propionitrile, benzonitrile or $C_3$–$C_{10}$-ketones such as acetone, acetylacetone or $C_2$–$C_{10}$-ethers such as dimethyl ether, diethyl ether or tetrahydrofuran, or else amines such as ethylenediamine or diethylamine.

Ligands $L^1$, $L^2$ in (III) which are particularly suitable for catalysts which need no activator b) or iv) are those of the formula (V)

G—OH  (V)

where G is hydrogen or a $C_1$–$C_{15}$ organocarbon radical bearing a Lewis base group. Suitable $C_1$–$C_{15}$ organic radicals G are, for example, linear or cyclic –(CH$_2$)$_n$– units where n is from 1 to 10, i.e. methylene, 1,2-ethylene, 1,3-propylene, 1,4-butylene, 1,5-pentylene, 1,6-hexylene, 1,7-heptylene, 1,8-octylene, 1,9-nonylene or 1,10-decylene.

Suitable Lewis base groups are ether, ester, ketone, amine, phosphine and in particular nitrile (—C≡N) or tertiary amine.

Examples of suitable compounds G—OH are water or α-ω-hydroxynitriles such as NC–(CH$_2$)$_h$OH where h=1–10 or (2-hydroxymethyl)tetrahydrofuran, and also (2-hydroxymethyl) (N-organo)pyrrolidines (Va) or (2-hydroxymethyl)(N-organo)piperidines (Vb)

(Va)

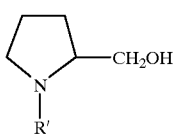

(Vb)

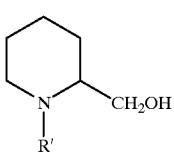

where R' is $C_1$–$C_{10}$-alkyl or $C_3$–$C_{10}$-cycloalkyl, for example methyl, ethyl, n-propyl, i-propyl, n-butyl, i-butyl, s-butyl, t-butyl, cyclopentyl, cyclohexyl. R' can also be $C_6$–$C_{10}$-aryl, such as phenyl or naphthyl.

In general, the ligands G—OH are, with the exception of water, attached to the metal M in (III) via the above-defined Lewis base group.

The choice of the anions T is generally not critical. Examples of suitable anions T in (III) are perchlorate, sulfate, phosphate, nitrate and carboxylates, such as acetate, trifluoroacetate, trichloroacetate, propionate, oxalate, citrate, benzoate, and also conjugated anions of organosulfonic acids, for example methylsulfonate, trifluoromethylsulfonate and p-toluenesulfonate, also tetrafluoroborate, tetrakis(bis(trifluoromethyl)phenyl)borate, tetraphenylborate, tetrakis(pentafluorophenyl)borate, hexafluorophosphate, hexafluoroarsenate or hexafluoroantimonate. Preference is given to using perchlorate, trifluoroacetate, sulfonates such as methylsulfonate, trifluoromethylsulfonate, p-toluenesulfonate, tetrafluoroborate or hexafluorophosphate, especially trifluoroacetate, perchlorate or p-toluenesulfonate, as anion T.

Particularly suitable metal complexes (IIIa) are (1,3-bis (diphenylphosphino)propane)bis(acetonitrile)palladium bis (tetrafluoroborate) (=[Pd(dppp)(NCCH$_3$)$_2$](BF$_4$)$_2$, dppp=1,3 (diphenylphosphino)propane), (1,3-bis(diphenylphosphino) propane)diaquopalladium bis(tetrafluoroborate), (1,3-bis (diphenylphosphino)propane)bis(3-hydroxypropionitrile) palladium bis(tetrafluoroborate), (1,4-bis (diphenylphosphino)butane)bis(acetonitrile)palladium bis (tetrafluoroborate) and (1,4-bis(diphenylphosphino)butane) diaquopalladium bis(tetrafluoroborate).

The metal complexes (IIIb) or catalyst systems comprising compound (IVb) are preferably used in the case of a copolymerization mixture comprising a vinylaromatic compound, eg. styrene.

The metal complexes of the formula (III) are generally prepared by literature methods, as described in Makromol. Chem. 1993, 194, p. 2579. Tetrakis(ligand)metal complexes such as tetrakis(acetonitrile)palladium bis(tetrafluoroborate) can usually be reacted with the chelating compounds (IV) and the ligands $L^1$, $L^2$ or G—OH to give the metal complexes (III). A preferred method for preparing the aquo complexes (III) is reacting the (chelating phosphine) (acetonitrile)metal complexes with water. The reaction is generally carried out in a solvent, for example dichloromethane, acetonitrile or water, at from 0° C. to 40° C.

In the in situ generation of the polymerization catalysts, the metals M are usually used in the form of their salts and are brought into contact with the chelating compound iii) of the formula (IV) and the acids ii). This can be done before contacting the catalytically active material obtainable in this way with the monomers and, if desired, a further activator iv) generally outside the polymerization reactor. However, the reaction of the individual components metal salt i), chelating compound iii) of the formula (IV), acid ii) and, if desired, activator component iv) can also be carried out in the polymerization reactor in the presence of the monomers.

Suitable salts of the metals M are generally halides, sulfates, phosphates, nitrates and carboxylates, such as acetates, propionates, oxalates, citrates, benzoates, and also sulfonic acid salts such as methylsulfonates, trifluoromethylsulfonate and p-toluenesulfonate. Preference is given to using carboxylates, sulfonic acid derivatives and especially acetates.

Particularly suitable catalyst components i) are palladium dicarboxylates, preferably palladium diacetate, palladium dipropionate, palladium bis(trifluoroacetate) and palladium oxalate, and also palladium sulfonates, preferably palladium bis(trifluoromethanesulfonate), palladium bis (methanesulfonate) and palladium bis(p-toluenesulfonate). Particular preference is given to using palladium diacetate.

Catalyst constituents ii) that can be used are Lewis and protic acids and mixtures thereof.

Suitable protic acids ii) are strong mineral acids such as sulfuric acid and perchloric acid, and also strong organic acids, for example trichloroacetic and trifluoroacetic acids, and also the sulfonic acids methanesulfonic acid, p-toluenesulfonic acid and benzenesulfonic acid, i.e. in each case acids which preferably have a $pK_a$, of less than 3.

The acidic salts of strong acids and weak bases, for example ammonium salts of the abovementioned acids, are also suitable.

Examples of suitable Lewis acids are halides of the elements of group IIIA of the Periodic Table of the Elements, for example boron trifluoride, boron trichloride, aluminum trifluoride, aluminum trichloride, halides of the elements of group VA of the Periodic Table of the Elements, e.g. phosphorus pentafluoride and antimony pentafluoride, and also halides of the metals of subgroup IVB of the Periodic Table of the Elements, for example titanium tetrachloride or zirconium tetrachloride. Further suitable Lewis acids are organically substituted Lewis acids, for example tris (pentafluorophenyl)borane.

Preference is given to using boron trifluoride, antimony pentafluoride or tris(pentafluorophenyl)borane as Lewis acids.

Particularly preferred components ii) are those which have a weakly coordinating conjugated anion, i.e. an anion which forms only a weak attachment to the central metal of the complex, such as tetrafluoroborate, hexafluorophosphate, perchlorate, trifluoroacetate, trifluoromethylsulfonate, p-tosylate and borates such as catechol borate and tetraaryl borate, particularly suitable aryl groups being 2,5-dimethylphenyl, 2,5-bis(trifluoromethyl) phenyl and pentafluorophenyl.

As for the rest, suitable catalyst components i) and ii) are those which are generally known from EP-A 501 576 and 516 238 for systems containing bisphosphines.

As component iii), the catalyst systems comprise a chelating compound $R^1R^2E^1$—Z—$E^2R^3R^4$ (IVa) or a bipyridyl compound (IVb), which was described in the discussion of the metal complexes (III).

The ratio of the catalyst constituents i), ii) and iii) to one another is generally such that the molar ratio of the metal compound i) to the acid ii) is from 0.01:1 to 100:1, preferably from 0.1:1 to 1:1, and the molar ratio of the metal compound i) to the component iii) is from 0.01:1 to 10:1, preferably from 0.1:1 to 2:1.

The activator component b) or iv) is generally a chemical compound which contains at least one hydroxyl group in the molecule. These include, in particular, $C_1$–$C_{10}$-alcohols such as methanol, ethanol, n-propanol, i-propanol, n-butanol, i-butanol, s-butanol, t-butanol, n-hexanol, n-octanol, n-decanol, cyclohexanol, phenol or water. Preference is given to using methanol and/or water as activator component b) or iv).

The molar ratio of activator component b) or iv) to metal M is in the range from 0 to 1500, preferably in the range from 0 to 1300. It has been found to be advantageous not to exceed the maximum ratio in the polymerization reaction, since otherwise the average molecular weights Mw of the carbon monoxide copolymers formed could be too low.

In general, the addition of the activator b) or iv) is unnecessary when the Lewis base ligands $L^1$, $L^2$ present in the catalyst are ones which contain a hydroxyl group in the molecule and have been defined more precisely above by the formula G—OH (V).

Furthermore, it has been found that the addition of an activator component is superfluous when the 1-alkene compounds used are ones which have hydroxyl groups as polar groups, giving high productivities and yields. The carbon monoxide copolymers of the invention obtainable in this way generally have comparatively high molecular weights $M_w$.

Particularly suitable reaction parameters for the preparation of the functionalized copolymers of carbon monoxide and olefinically unsaturated compounds (A) and, if desired, (B) have been found to be pressures from 100 to 500000 kPa, preferably from 500 to 350000 kPa and especially from 1000 to 10000 kPa, and temperatures of from −50 to 400° C., preferably from 10 to 250° C., especially from 20 to 100° C.

The polymerization reactions can be carried out in the gas phase in a fluidized bed or stirred, in suspension, in solution, in liquid or supercritical monomers and in solvents which are inert under the polymerization conditions.

The polymerization reactions can be carried out in a virtually alcohol-free or water-free polymerization medium. So no alcohol or water apart from the activator component b) or iv), if present, is added to the reaction mixture comprising monomers, catalyst and possibly inert solvent or suspension medium.

Suitable inert solvents and suspension media are those which contain no hydroxyl group in the molecule, i.e. ethers such as diethyl ether, tetrahydrofuran, aromatic solvents such as benzene, toluene, ethylbenzene, chlorobenzene, aliphatic hydrocarbons such as i-butane or chlorinated aliphatic hydrocarbons such as dichloromethane, 1,1,1-trichloromethane or mixtures of these.

In a polymerization method which has been found to be particularly suitable, the catalyst is placed in an inert solvent, the activator component b) or iv) is subsequently added, if desired, and the monomers are subsequently added and the polymerization is carried out at from 20 to 100° C. and at from 1000 to 10000 kPa.

The carbon monoxide copolymers of the invention can be processed by means of injection molding, blow molding, spinning, rotational molding, extrusion or spin coating. It is also possible to coat metallic, ceramic and other surfaces, e.g. those of plastic materials.

Carbon monoxide copolymers of the invention are suitable for the preparation of fibers, sheets, moldings and coatings.

The Examples which follow illustrate the invention.

EXAMPLES

I. Measurement Methods and Apparatus

The molecular weights $M_w$, and the molecular weight distributions $M_w/M_n$ were determined by GPC in $CHCl_3$ using a Waters 590 HPLC pump, Waters Microstyragel columns having pore sizes of $10^5$, $10^4$ and $10^3$ Å, a Waters 410 differential refractometer and a Waters 486 UV detector.

$^1$H NMR and $^{13}$C NMR measurements were carried out using a Bruker AC 200 or AMX 500 spectrometer.

The DSC data were determined using a Perkin Elmer DSC 7 instrument equipped with a Perkin Elmer TAC 7/DX Thermocontroller. Cyclohexane, indium and gallium were used for calibration.

Melting points were determined on a Mettler FP82HT hotplate and a Mettler FP90 processor using a Zeiss Axioskop Pol Microscope.

IR spectra were recorded on a Bruker IFS 66V spectrometer. The samples were prepared by applying a thin film to KBr plates from a dichloromethane solution.

The catalyst used was $[Pd[dppp](NCCH_3)_2](BF_4)_2$, prepared from $[Pd[NCCH_3)_4](BF_4)_2$ (Aldrich) and 1,3-bis (diphenylphosphino)propane (=dppp) (Strem Chemicals) as described in F. Y. Xu, A. X. Zhao, J. C. W. Chien, Makromol. Chem. 1993, 194, 2597.

Toluene, dichloromethane and triethylamine were distilled over sodium/benzophenone, calcium hydride and KOH, respectively, before use. Methanol was purified by distillation over magnesium wire. 2-Allylphenol (M1), 4-allylmethoxybenzene (M3) (both Fluka products) and 4-allyl-2-methoxyphenol (M4) (Merck) were used as commercially obtained. 2-Allylmethoxybenzene (M2), was prepared as described in F. Ullmann, Liebigs Ann. Chem. 1995, 327, p. 114.

II. General Copolymerization Procedures a) Preparation of binary carbon monoxide copolymers Methanol (0.25 ml) and the monomer compound (A) (M1, M2, M3 or M4; 38 mmol) (Examples 1 to 4) were added to a solution of the catalyst complex [Pd[dppp](NCCH$_3$)$_2$] (BF$_4$)$_2$ (0.049 mmol) in dichloromethane (25 ml) in a 100 ml steel autoclave and the mixture was stirred under a carbon monoxide pressure of 60.8×10$^5$ Pa at room temperature for 24 h. The polymerization was stopped by venting and diluting with dichloromethane, the reaction mixture was freed of catalyst residues by filtration through a short silica gel column. Most of the solvent was distilled off and the polymer product was precipitated by addition of methanol. Filtration and drying under reduced pressure gave pure copolymer material. If the solvent was slowly evaporated off instead of methanol being added to the reaction mixture, a virtually colorless polymer film was obtained. Further details about the amounts of starting materials used and the product parameters are shown in Table 1. Table 2 shows the results of a copolymerization of carbon monoxide and 2-allylphenol as described in a), except that the activator concentration was varied (Examples 5 to 8).

b) Methanol (0.25 ml) and the monomer component (A) (M1 or M3) were added to a solution of the catalyst complex [Pd[dppp](NCCH$_3$)$_2$](BF$_4$)$_2$ (0.049 mmol) in dichloromethane (40 ml) in a 100 ml steel autoclave. The copolymerization was carried out at a propene pressure of 9.1× 10$^5$ Pa and a carbon monoxide pressure of 51.7×10$^5$ Pa at room temperature for 16 h while stirring. The polymerization was stopped by venting the autoclave and diluting with dichloromethane. The reaction mixture was freed of catalyst residues by filtration through a short silica gel column, most of the solvent was removed by distillation and the polymer product was precipitated by addition of methanol. Filtration and drying under reduced pressure gave the desired terpolymer. If the solvent was slowly evaporated off instead of precipitating the polymer product by adding methanol, a virtually colorless polymer film was obtained. Further details about the amount of component (A) used in each case and the product parameters are shown in Table 3 (Examples 9 to 12).

III. Spectroscopic Data

Copolymer of carbon monoxide and 2-allylphenol (M1): IR: 3421 cm$^{-1}$ (O—H); 1700 cm$^{-1}$ (C=O).

$^1$H NMR (CDCl$_3$): δ=7.2–6.4; 3.4–1.0; ratio of areas under the peaks 1:1.2.

$^{13}$C NMR (CDCl$_3$): δ=209.1; 153.8; 151.6; 130.6; 127.4; 125.8; 120.4; 116.4; 108.2; 42.4; 33.8; 28.7.

Copolymer of carbon monoxide and 2-allylmethoxybenzene (M2): IR: 1707 cm$^{-1}$ (C=O).

$^1$H NMR (CDCl$_3$): δ=7.10 (m, 2H, Ar); 6.83 (m, 2H, Ar); 3.80 (m, 3H, CH$_3$); 3.4–1.5 (m, 5H, CH$_2$ and CH).

$^{13}$C NMR (CDCl$_3$): δ=212.0; 157.3; 131.0; 129.8; 127.4; 120.6; 110.4; 55.4; 45.9; 34.3; 32.1.

Copolymer of carbon monoxide and 4-allylmethoxybenzene (M3): IR: 1707 cm$^{-1}$ (C=O).

$^1$H NMR (CDCl$_3$): δ=6.97 (m, 2H, Ar); 6.78 (m, 2H, Ar); 3.74 (s, 3H, CH$_3$); 3.11 (m, 1H, CH); 2.71 (m, 2H, α-CH$_2$); 2.19 (m, 2H, CH$_2$).

$^{13}$C NMR (CDCl$_3$): δ=211.6; 211.0; 208.6; 157.8; 131.8; 129.7; 113.6; 56.7; 47.5; 43.5; 33.9.

Copolymer of carbon monoxide and 4-allyl-2-hydroxymethoxybenzene (M4): IR: 3436 cm$^{-1}$ (O—H); 1705 cm$^{-1}$ (C=O).

$^1$H NMR (CDCl$_3$): δ=6.85 (m, 2H, Ar); 6.65 (m, 2H, Ar); 6.00 (m, 1H, —OH); 3.82 (s, 3H, CH$_3$); 3.10 (m, 1H, —CH); 2.65 (m, 2H, CH$_2$); 2.12 (m, 2H, CH$_2$).

$^{13}$C NMR (CDCl$_3$): δ=213.2; 211.3; 209.2; 146.5; 144.1; 131.7; 212.5; 115.2; 111.4; 55.4.

Terpolymer of carbon monoxide, 2-allylphenol and propene:

$^1$H NMR (CDCl$_3$): δ=7.2–6.5 (m, Ar); 3.3–1.5 (m, CH, CH$_2$, α-CH$_2$); 1.4–0.5 (CH$_3$).

Terpolymer of carbon monoxide, 2-allylmethoxybenzene and propene:

$^1$H NMR (CDCl$_3$): δ=7.2–6.6 (m, Ar); 4.1–3.7 (OCH$_3$); 3.3–1.5 (m, CH, CH$_2$, α-CH$_2$); 1.4–0.6 (CH$_3$).

TABLE 1

| Ex. | Alkene (A) (38 mmol) | Yield (g) | $M_w$ (g/mol) | $M_w/M_n$ [a] | $T_g$ (° C.) |
|---|---|---|---|---|---|
| 1 | 2-allylphenol | 5.25 | 10,900 | 1.5 | —[b] |
| 2 | 2-allylmethoxybenzene | 2.7 | 14,000 | 1.8 | 55.25 |
| 3 | 4-allylmethoxybenzene | 0.34 | 8,500 | 1.4 | n.d.[c] |
| 4 | 4-allyl-2-methoxyphenol | 0.2 | 1,200 | 1.9 | n.d.[c] |

[a] determined by GPC against a polystyrene standard
[b] no glass transition observed
[c] not determined

TABLE 2

| Example | Methanol (ml) | Yield (g) | $M_w$ [a] (g/mol) | $M_w/M_n$ [a] |
|---|---|---|---|---|
| 5 | 0 | 3.8 | 20,200 | 2.1 |
| 6 | 0.25 | 5.3 | 10,900 | 1.5 |
| 7 | 1.0 | 5.6 | 7,100 | 1.9 |
| 8 | 2.0 | 5.5 | 2,600 | 1.7 |

[a] determined by GPC against a polystyrene standard

TABLE 3

| Ex. | Alkene (A) | Terpolymer yield (g) | $M_w$ [a] (g/mol) | $T_g$ (° C.) | Mol-% [b] |
|---|---|---|---|---|---|
| 9 | 2-allylphenol: 19 mmol | 2.4 | 77,200 | 65.9 | 19 |
| 10 | 2-allylphenol: 38 mmol | 6.0 | 89,500 | 81.2 | 26 |
| 11 | 2-allylphenol: 57 mmol | 5.1 | 183,000 | 73.4 | 31 |
| 12 | 4-allylmethoxybenzene: 38 mmol | 2.3 | 133,000 | 30.7 | 6 |

[a] determined by GPC against a polystyrene standard
[b] proportion of component (A) incorporated, based on CO units in the polymer chain (determined by $^1$H NMR spectroscopy)

We claim:

1. A process for preparing functionalized linear alternating carbon monoxide copolymers, which comprises copolymerizing carbon monoxide with at least one 1-alkene (A) which is an aryl derivative containing one or more polar groups and substituted with at least one terminal allyl and/or homoallyl unit, and, if desired, at least one $C_2$–$C_{10}$-1-alkene (B) in a virtually alcohol-free or water-free polymerization medium in the presence of a catalyst whose active material is formed from a) a metal complex of the formula (IIIa) or (IIIb)

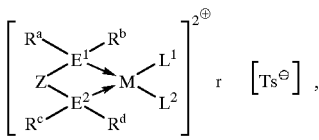
(IIIa)

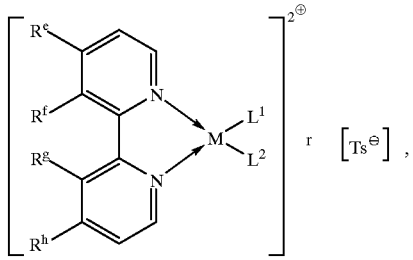
(IIIb)

where

M is a metal of group VIIIB of the Periodic Table of the Elements, $E^1$, $E^2$ are each an element from group VA of the Periodic Table of the Elements, Z is a bridging structural unit comprising one, two, three or four structural subunits of elements of group IVA, VA, VIA of the Periodic Table of the elements, $R^a$ to $R^d$ are substituents selected from the group consisting of aromatic radicals which radicals may contain one or more elements of groups IVA, VA VIA and VIIA of the Periodic Table of the Elements, $R^e$ to $R^h$ are each, independently of one another, hydrogen, linear or branched $C_1$–$C_6$-alkyl or $R^f$ and $R^g$ are together a five- or six-membered carbocycle or heterocycle, $L^1$, $L^2$ are formally uncharged Lewis base ligands, T is a monovalent or divalent anion, r,s are each 1 or 2, provided r×s=2, and b) an activator component which contains a hydroxyl group in the molecule and is used in a an amount of from 0 to 1500 molar equivalents, based on M in (III).

2. A process as claimed in claim 1, wherein (A) is a compound of the formula (Ia) or (Ib)

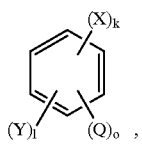
(Ia)

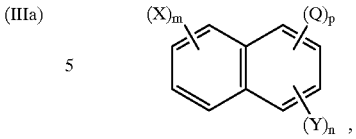
(Ib)

where

X is $OR^1$, $NR^2R^3$, halo, nitro or $CO_2R^4$, where $R^1$ is hydrogen, $C_1$–$C_{10}$-alkyl, $C_3$–$C_{10}$-cycloalkyl, $C_6$–$C_{14}$-aryl, $C(O)R^5$ or $Si(R^6)_3$, $R^2$, $R^3$ are each hydrogen, $C_1$–$C_{10}$-alkyl, $C_3$–$C_{10}$-cycloalkyl, $C_6$–$C_{14}$-aryl or are, together with N, a cycle consisting of 2–10 carbon atoms or a cycle consisting of 2–10 carbon atoms and at least one further heteroatom in the cycle, $R^4$ is $C_1$–$C_{10}$-alkyl or $C_6$–$C_{14}$-aryl, $R^5$ is $C_1$–$C_{10}$-alkyl or $C_6$–$C_{14}$-aryl, $R^6$ is independently at each appearance $C_1$–$C_{10}$-alkyl, $C_3$–$C_{10}$-cycloalkyl or $C_6$–$C_{14}$-aryl, Y is a compound of the formula (II)

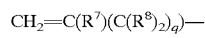
(II), where $R^7$ is hydrogen, $C_1$–$C_{10}$-alkyl, $C_3$–$C_{10}$-cycloalkyl or $C_6$–$C_{10}$-aryl and $R^8$ is independently at each appearance hydrogen, $C_1$–$C_{10}$-alkyl, $C_3$–$C_{10}$-cycloalkyl, $C_6$–$C_{10}$-aryl or halo and q is 1 or 2, Q is $C_1$–$C_{10}$-alkyl, $C_6$–$C_{14}$-aryl, $C_3$–$C_{10}$-cycloalkyl, aralkyl having from 1 to 6 carbon atoms in the alkyl moiety and from 6 to 14 carbon atoms in the aryl moiety or $C_3$–$C_{30}$-organosilyl, where in the case of (Ia)

k, l are each an integer from 1 to 5, and o is an integer from 0 to 4 where k+l+o≦6 and in the case of (Ib)

m, n are each an integer from 1 to 7 and p is an integer from 0 to 6 where m+n+p≦8.

3. A process as claimed in claim 1, wherein the terminal allyl moiety in (A) is ortho to a polar group.

4. A process as claimed in claim 1, wherein at least one polar group in (A) is hydroxyl.

5. A process as claimed in claim 4, wherein no activator component is added.

6. A process as claimed in claim 1, wherein said 1-alkene (B) is ethene, propene, 1-butene or styrene, or a mixture of said 1-alkenes.

* * * * *